US010802508B2

(12) United States Patent
Saunders et al.

(10) Patent No.: US 10,802,508 B2
(45) Date of Patent: *Oct. 13, 2020

(54) MOBILE ROBOT

(71) Applicant: Boston Dynamics, Inc., Waltham, MA (US)

(72) Inventors: John Aaron Saunders, Arlington, MA (US); Kevin Blankespoor, Arlington, MA (US); Steven D. Potter, Bedford, MA (US)

(73) Assignee: Boston Dynamics, Inc., Waltham, MA (US)

(*) Notice: Subject to any disclaimer, the term of this patent is extended or adjusted under 35 U.S.C. 154(b) by 304 days.

This patent is subject to a terminal disclaimer.

(21) Appl. No.: 15/902,893

(22) Filed: Feb. 22, 2018

(65) Prior Publication Data

US 2019/0258275 A1    Aug. 22, 2019

(51) Int. Cl.
G05D 1/08        (2006.01)
B25J 9/16        (2006.01)
B25J 5/00        (2006.01)
B25J 13/08       (2006.01)
B25J 15/00       (2006.01)
B25J 19/00       (2006.01)

(52) U.S. Cl.
CPC .......... *G05D 1/0891* (2013.01); *B25J 5/007* (2013.01); *B25J 9/162* (2013.01); *B25J 9/1615* (2013.01); *B25J 9/1694* (2013.01); *B25J 13/089* (2013.01); *B25J 15/00* (2013.01); *B25J 19/002* (2013.01); *G05B 2219/40077* (2013.01); *G05D 2201/0217* (2013.01); *Y10S 901/01* (2013.01); *Y10S 901/09* (2013.01); *Y10S 901/40* (2013.01); *Y10S 901/46* (2013.01); *Y10S 901/48* (2013.01)

(58) Field of Classification Search
USPC .................................................. 700/245–264
See application file for complete search history.

(56) References Cited

U.S. PATENT DOCUMENTS 6,527,071 B1 * 3/2003 Villedieu ............... B62D 57/02
                                                      180/7.1
7,348,747 B1 * 3/2008 Theobold ................. B25J 5/005
                                                    318/568.11
7,798,264 B2 * 9/2010 Hutcheson ............. B60L 15/20
                                                      180/65.1

(Continued)

FOREIGN PATENT DOCUMENTS

CN      102520720 A      6/2012
CN      102923204 A      2/2013

(Continued)

OTHER PUBLICATIONS

International Search Report and Written Opinion, PCT/US2019/013791, dated May 8, 2019, 216 pages.

*Primary Examiner* — Jonathan L Sample
(74) *Attorney, Agent, or Firm* — Honigman LLP; Brett A. Krueger

(57) ABSTRACT

A robot includes an inverted pendulum body having first and second end portions, a counter-balance body disposed on the inverted pendulum body and configured to move relative to the inverted pendulum body, at least one leg having first and second ends, and a drive wheel rotatably coupled to the second end of the at least one leg. The first end of the at least one leg is prismatically coupled to the second end portion of the inverted pendulum body.

21 Claims, 8 Drawing Sheets

(56) References Cited

U.S. PATENT DOCUMENTS

| | | | | |
|---|---|---|---|---|
| 8,041,456 B1* | 10/2011 | Blackwell | ............ | B25J 9/1674 318/568.12 |
| 8,160,747 B1* | 4/2012 | Blackwell | ............ | B25J 9/162 700/245 |
| 8,306,664 B1* | 11/2012 | Wiley | ............ | B25J 5/007 280/304 |
| 8,442,661 B1* | 5/2013 | Blackwell | ............ | B25J 9/1689 700/245 |
| 8,457,830 B2* | 6/2013 | Goulding | ............ | B62D 57/024 701/26 |
| 9,561,829 B1* | 2/2017 | Urata | ............ | B25J 19/0054 |
| 9,567,021 B2* | 2/2017 | Mailey | ............ | A61G 5/061 |
| 9,662,792 B2* | 5/2017 | Khripin | ............ | B25J 9/1664 |
| 9,981,389 B2* | 5/2018 | Kennedy | ............ | B25J 9/06 |
| 10,108,185 B1* | 10/2018 | Theobald | ............ | G05B 19/4189 |
| 10,168,699 B1* | 1/2019 | Theobald | ............ | G05D 1/0088 |
| 2008/0097644 A1* | 4/2008 | Kaznov | ............ | A63H 29/22 700/245 |
| 2010/0017106 A1* | 1/2010 | Doi | ............ | G05D 1/0891 701/124 |
| 2010/0243344 A1* | 9/2010 | Wyrobek | ............ | B25J 19/0016 180/21 |
| 2011/0071677 A1* | 3/2011 | Stilman | ............ | B25J 19/002 700/254 |
| 2011/0077773 A1* | 3/2011 | Yu | ............ | B25J 9/08 700/253 |
| 2011/0313568 A1* | 12/2011 | Blackwell | ............ | B25J 19/0012 700/245 |
| 2012/0095598 A1* | 4/2012 | Nagasaka | ............ | B25J 9/1607 700/260 |
| 2012/0215355 A1* | 8/2012 | Bewley | ............ | B62D 55/075 700/258 |
| 2015/0190927 A1* | 7/2015 | Sutherland | ............ | H04W 4/70 700/259 |
| 2017/0036346 A1* | 2/2017 | Kamioka | ............ | B62D 57/032 |
| 2017/0106738 A1* | 4/2017 | Gillett | ............ | A63C 17/014 |
| 2017/0106739 A1† | 4/2017 | Gillett | | |
| 2018/0043952 A1* | 2/2018 | Ellerman | ............ | B62D 15/00 |
| 2019/0248003 A1* | 8/2019 | Nagarajan | ............ | B25J 9/1697 |

FOREIGN PATENT DOCUMENTS

| | | |
|---|---|---|
| WO | 2009143377 A2 | 11/2009 |
| WO | 2012066678 A1 | 5/2012 |
| WO | 2014141356 A1 | 9/2014 |

\* cited by examiner
† cited by third party

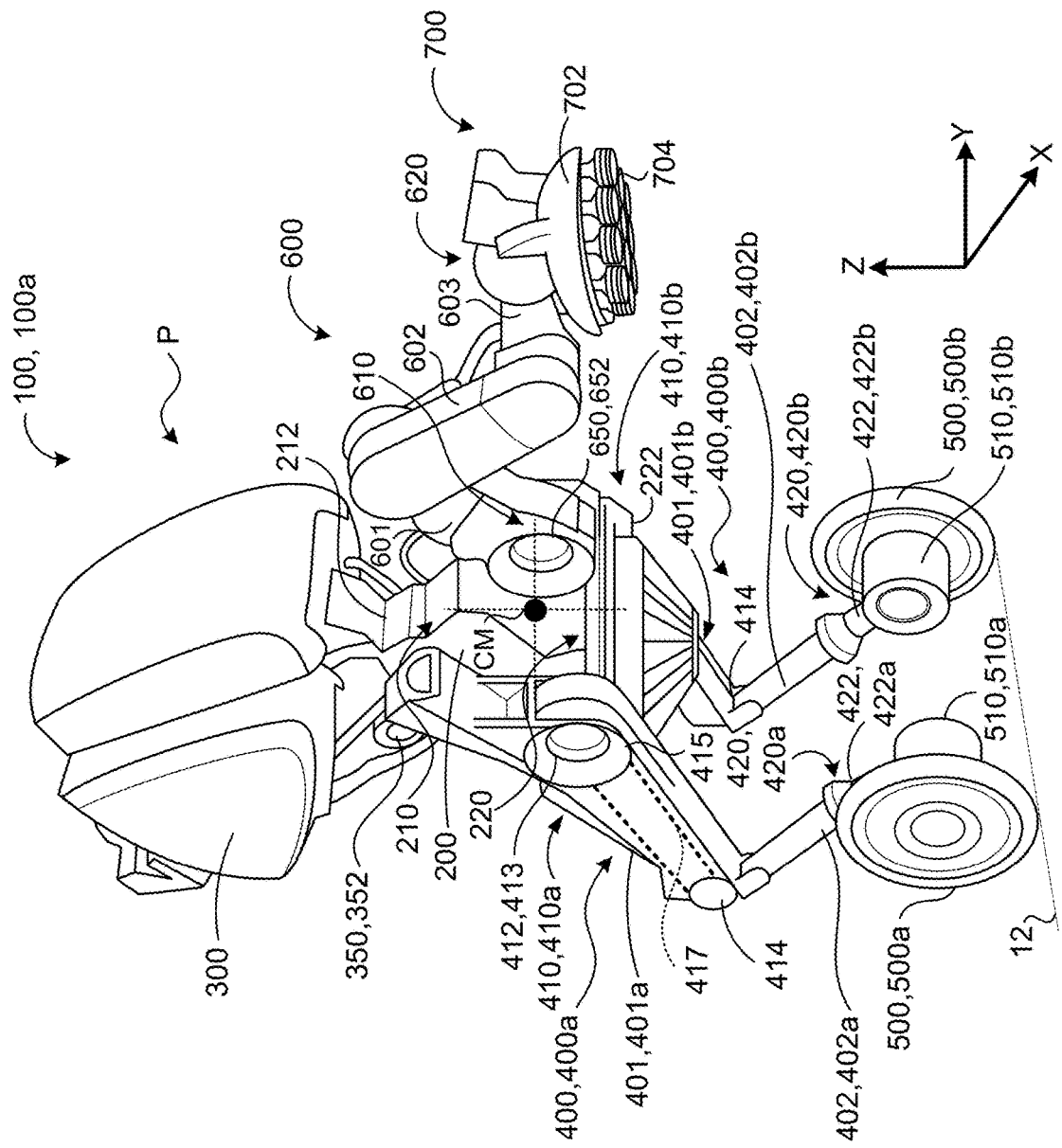

MOBILE ROBOT

TECHNICAL FIELD

This disclosure relates to mobile robots.

BACKGROUND

Robots currently perform tasks in various working environments, such as factories, storage facilities, office buildings, and hospitals. Moreover, robots are sometimes designed with large stationary or moveable bases that allow the robot to maintain an upright position while performing tasks that involve lifting and handling heavy objects without tipping over. The large bases, however, tend to be heavy, large, slow, and cumbersome, severely limiting mobility and being inappropriate for use in areas with tight footprints. While other robots with smaller and lighter bases or mobility platforms are more maneuverable than the robots with large bases, they are typically not practical for carrying heavy objects due to instabilities resulting from shifts in center of mass and changes in momentum as the objects are picked up and put down.

SUMMARY

One aspect of the disclosure provides a robot that includes an inverted pendulum body having first and second end portions, a counter-balance body disposed on the inverted pendulum body and configured to move relative to the inverted pendulum body, at least one leg having first and second ends, and a drive wheel rotatably coupled to the second end of the at least one leg. The first end of the at least one leg is prismatically coupled to the second end portion of the inverted pendulum body.

Implementations of the disclosure may include one or more of the following optional features. In some implementations, the at least one leg includes a right leg having first and second ends and a left leg having first and second ends. The first end of the right leg is prismatically coupled to the second end portion of the inverted pendulum body. The right leg has a right drive wheel rotatably coupled to the second end of the right leg. The first end of the left leg is prismatically coupled to the second end portion of the inverted pendulum body. The left leg has a left drive wheel rotatably coupled to the second end of the left leg.

The counter-balance body may be disposed on one of the first end portion of the inverted pendulum body or the second end portion of the inverted pendulum body. In some examples, the at least one leg has a variable length between the first and second ends of the at least one leg. The at least one leg may further include an upper portion extending between the first end prismatically coupled to the second end portion of the inverted pendulum body and a knee joint, and a lower portion extending between the knee joint and the second end rotatably coupled to the drive wheel. In some implementations, the lower portion is rotatably coupled to the knee joint and configured to rotate relative to the upper portion to alter a length between the first and second ends of the leg In some examples, the robot further includes at least one articulated arm disposed on the inverted pendulum body and configured to move relative to the inverted pendulum body. The at least one articulated arm may be rotatably coupled to one of the first end portion of the inverted pendulum body or the second end portion of the inverted pendulum body.

Another aspect of the disclosure provides a robot including a torso having first and second end portions, a manipulator head disposed on the torso and configured to move relative to the torso, a tail disposed on the torso and configured to move relative to the torso, at least one leg having first and second ends with the first end primstatically coupled to the second end portion of the torso, and a drive wheel rotatably coupled to the second end of the at least one leg.

This aspect may include one or more of the following optional features. In some implementations, the robot further includes a manipulator head actuator connected to the manipulator head and configured to move the manipulator head relative to the torso, a tail actuator connected to the tail and configured to move the tail relative to the torso, a leg actuator connected to the at least one leg and configured to rotate a portion of the at least one leg relative to the torso, and a drive motor coupled to the drive wheel of the at least one leg. In these implementations, the manipulator head actuator may be configured to pitch the manipulator head around a lateral axis of the robot relative to the torso, the lateral axis extending perpendicular to a fore-aft axis of the robot and a vertical gravitational axis. The tail actuator may similarly be configured to pitch the tail around the lateral axis of the robot relative to the torso. Optionally, the leg actuator may be configured to rotate the portion of the at least one leg relative to the torso to alter a length between the first and second ends of the leg.

In some examples, the robot further includes an inertial measurement unit and a controller in communication with the inertial measurement unit, the manipulator head actuator, the tail actuator, the leg actuator, and the drive motor. In these examples, the controller is configured to perform operations that include receiving inertial measurements from the inertial measurement unit, and instructing actuation of at least one of the manipulator head actuator, the tail actuator, the leg actuator, or the drive motor to alter a pose of the robot to move a center of mass of the robot relative to a gravitational vertical axis. In these examples, the inertial measurements are indicative of a pose of the robot relative to the gravitational vertical axis. Instructing actuation of at least one of the manipulator head actuator, the tail actuator, the leg actuator, or the drive motor includes instructing actuation of the manipulator head actuator to move the manipulator head relative to the torso; and instructing actuation of the tail actuator to move the tail relative to the torso to cancel out any shifting in the center of mass of the robot along a fore-aft axis.

In some implementations, the at least one leg includes a right leg having first and second ends and a left leg having first and second ends. The first end of the right leg is prismatically coupled to the second end portion of the inverted pendulum body. The right leg has a right drive wheel rotatably coupled to the second end of the right leg. The first end of the left leg is prismatically coupled to the second end portion of the inverted pendulum body. The left leg has a left drive wheel rotatably coupled to the second end of the left leg.

In some examples, the manipulator head is rotatably coupled to the first end portion of the torso and the tail is rotatably coupled to the second end portion of the torso. In other examples, the manipulator head is rotatably coupled to the second end portion of the torso and the tail is rotatably coupled to the first end portion of the torso. The robot may further include a second manipulator head disposed on the torso and configured to move relative to the torso.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is schematic view of an example robot.

Like reference symbols in the various drawings indicate like elements.

DETAILED DESCRIPTION

Figure 1B:
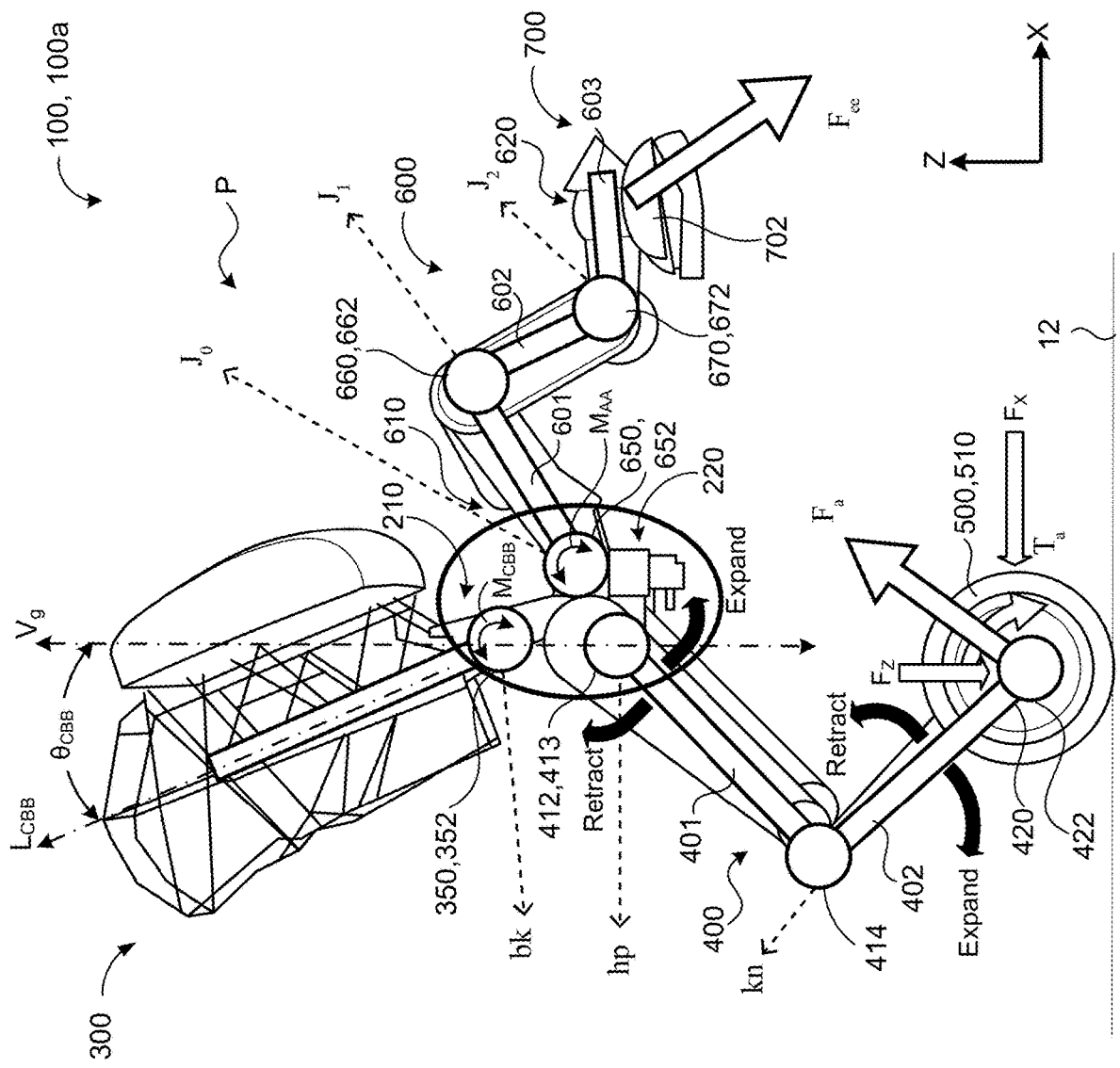
FIGS. 1B and 1C are schematic views of the robot of FIG. 1A showing a counter-balance body moving relative to an inverted pendulum body of the robot.

Referring to FIGS. 1A-1E, in some implementations, a robot 100, 100a includes an inverted pendulum body (IPB) 200, a counter-balance body 300 disposed on the IPB 200, at least one leg 400 having a first end 410 coupled to the IPB 200 and a second end 420, and a drive wheel 500 rotatably coupled to the second end 420 of the at least one leg 400. The robot 100 has a vertical gravitational axis $V_g$ (FIGS. 1B and 1C) along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 has first and second end portions 210, 220 and may be interchangeably referred to as a torso 200 for the robot 100. For instance, the IPB 200 may define a length between a first end 212 associated with the first end portion 210 and a second end 222 associated with the second end portion 220. In some examples, a point of delineation separating the first and second end portions 210, 220 is at a midpoint between the first end 212 and the second end 222, so that the first end portion 210 encompasses 50-percent of the length of the IPB 200 and the second end portion 220 encompasses the remaining 50-percent of the length of the IPB 200. In other examples, the point of delineation separating the first and second end portions 210, 220 of the IPB 200 is closer to one of the first end 212 or the second end 222 so that one of the first end portion 210 or the second end portion 220 extends along a larger portion of the length of the IPB 200 than the other one of the first end portion 210 or the second end portion 220. For instance, the first end portion 210 extending from the first end 212 may encompass 90-, 80-, 70-, 60-, 40-, 30-, 20-, 10-percent of the length of the IPB 200 while the second end portion 220 extending from the second end 222 may encompass the remaining 10-, 20-, 30-, 60-, 70-, 80-, 90-percent of the length of the IPB 200.

In some implementations, the counter-balance body 300 is disposed on the first end portion 210 of the IPB 200 and configured to move relative to the IPB 200. The counter-balance body 300 may be interchangeably referred to as a tail 300. A back joint bk, 350 may rotatably couple the counter-balance body 300 to the first end portion 210 of the IPB 200 to allow the counter-balance body 300 to rotate relative to the IPB 200. In the example shown, the back joint bk, 350 supports the counter-balance body 300 to allow the counter-balance body 300 to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100.

Referring to FIG. 1B, the counter-balance body 300 has a longitudinal axis $L_{CBB}$ extending from the back joint bk, 350 and is configured to pivot at the back joint bk, 350 to move/pitch around the lateral axis (y-axis) relative to the IPB 200 (in both the clockwise and counter-clockwise directions relative to the view shown in FIG. 1B). Accordingly, the back joint bk, 350 may be referred to as a pitch joint. The pose P of the robot 100 may be defined at least in part by a rotational angle $\theta_{CBB}$ of the counter-balance body 300 relative to the vertical gravitational axis $V_g$. Moreover, the counter-balance body 300 may generate/impart a moment $M_{CBB}$ (rotational force) at the back joint bk, 350 based on the rotational angle $\theta_{CBB}$ of the counter-balance body 300 relative to the vertical gravitational axis $V_g$. Thus, movement by the counter-balance body 300 relative to the IPB 200 alters the pose P of the robot 100 by moving the CM of the robot 100 relative to the vertical gravitational axis $V_g$. A rotational actuator 352 (e.g., a tail actuator) may be positioned at or near the back joint bk, 350 for controlling movement by the counter-balance body 300 (e.g., tail) about the lateral axis (y-axis). The rotational actuator 352 may include an electric motor, electro-hydraulic servo, piezo-electric actuator, solenoid actuator, pneumatic actuator, or other actuator technology suitable for accurately effecting movement of the counter-balance body 300 relative to the IPB 200.

The rotational movement by the counter-balance body 300 relative to the IPB 200 alters the pose P of the robot 100 for balancing and maintaining the robot 100 in an upright position. For instance, similar to rotation by a flywheel in a conventional inverted pendulum flywheel, rotation by the counter-balance body 300 relative to the gravitational vertical axis $V_g$ generates/imparts the moment $M_{CBB}$ at the back joint bk, 350 to alter the pose P of the robot 100. By moving the counter-balance body 300 relative to the IPB 200 to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the counter-balance body 300 includes a corresponding mass that is offset from the moment $M_{CBB}$ imparted at the back joint bk, 350. In some configurations, a gyroscope disposed at the back joint bk, 350 could be used in lieu of the counter-balance body 300 to spin and impart the moment $M_{CBB}$ (rotational force) for balancing and maintaining the robot 100 in the upright position.

Figure 1C:
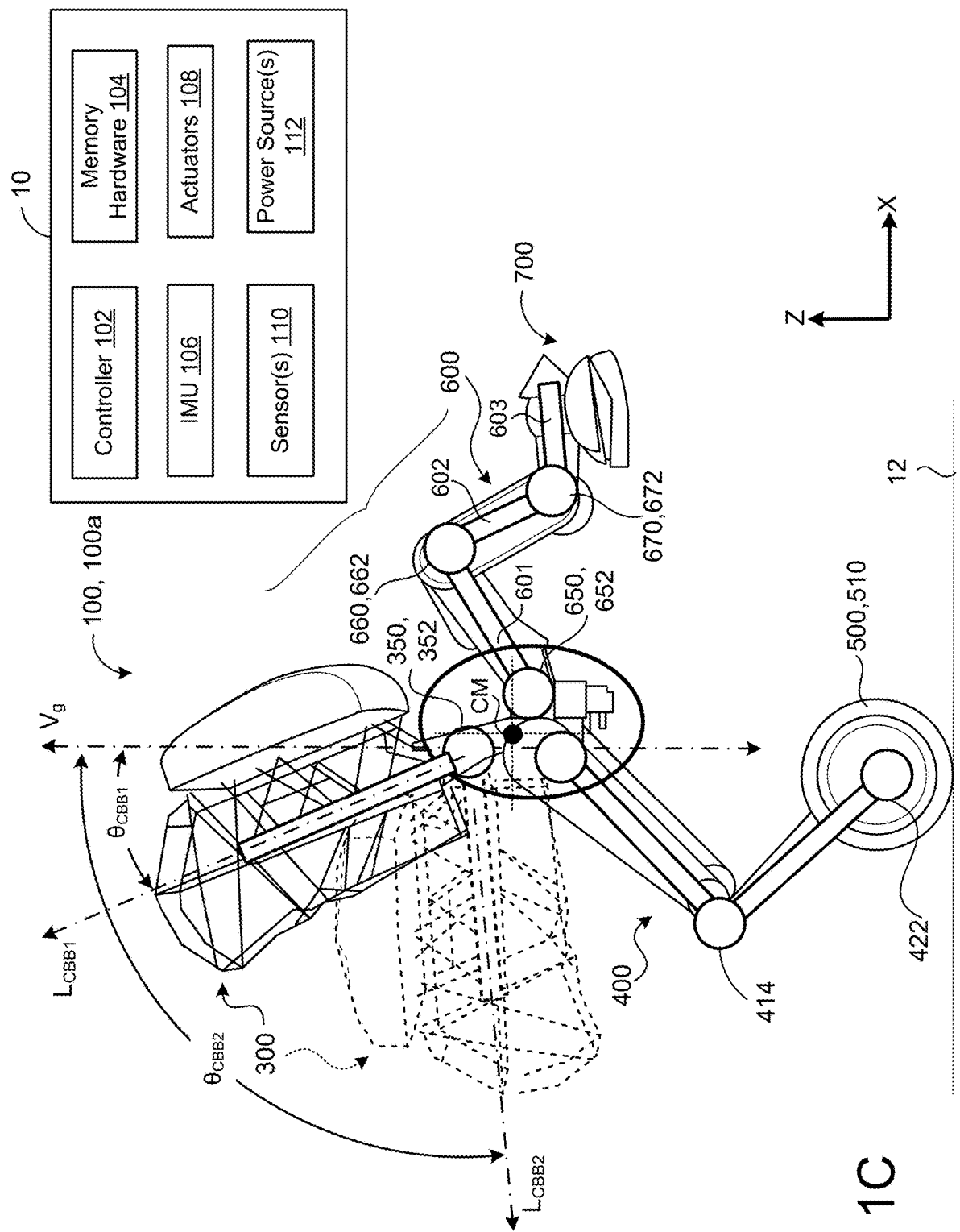

Referring to FIG. 1C, the counter-balance body 300 may rotate (e.g., pitch) about the back joint bk, 350 in both the clockwise and counter-clockwise directions (e.g., about the y-axis in the "pitch direction" relative to the view shown in FIG. 1C) to create an oscillating (e.g., wagging) movement. For example, the counter-balance body 300 may move/pitch about the lateral axis (y-axis) in a first direction (e.g., counter-clockwise direction) from a first position (solid lines) associated with longitudinal axis $L_{CBB1}$, having a first rotational angle $\theta_{CBB1}$ relative to the vertical gravitation axis $V_g$, to a second position (dashed lines) associated with longitudinal axis $L_{CBB2}$, having a second rotational angle $\theta_{CBB2}$ relative to the vertical gravitation axis $V_g$. Movement by the counter-balance body 300 relative to IPB 200 from the first position to the second position causes the CM of the robot 100 to shift and lower toward the ground surface 12.

The counter-balance body 300 may also move/pitch about the lateral axis (y-axis) in an opposite second direction (e.g., clockwise direction) from the second position (dashed lines) back to the first position or another position either before or beyond the first position. Movement by the counter-balance body 300 relative to the IPB 200 in the second direction away from the second position (dashed lines) causes the CM of the robot 100 to shift and raise away from the ground surface 12. Thus, increasing the rotational angle $\theta_{CBB}$ of the counter-balance body 300 relative to the vertical gravitational axis $V_g$ may cause the CM of the robot 100 to lower toward the ground surface 12, while decreasing the rotational angle $\theta_{CBB}$ of the counter-balance body 300 relative to the vertical gravitational axis $V_g$ may cause the CM of the robot 100 to raise away from the ground surface 12 and/or shift forward or backward relative to the point of contact between the drive wheels 500 and the ground surface 12. In some examples, the longitudinal axis $L_{CBB}$ of the counter-balance body 300 is coincident with the vertical gravitational axis $V_g$. The counter-balance body 300 may oscillate between movements in the first and second directions to create the wagging movement. The rotational velocity of the counter-balance body 300 when moving relative to the IPB 200 may be constant or changing (accelerating or decelerating) depending upon how quickly the pose P of the robot 100 needs to be altered for dynamically balancing the robot 100.

The first position (solid lines) associated with $L_{CBB1}$ and the second position (dashed lines) associated with $L_{CBB1}$ of the counter-balance body 300 of FIG. 1C are depicted as exemplary positions only, and are not intended to represent a complete range of motion of the counter-balance body 300 relative to the IPB 200. For instance, in other examples, the counter-balance body 300 may move/pitch around the lateral axis (y-axis) in the first direction (e.g., counter-clockwise direction) to positions having rotational angles $\theta_{CBB}$ greater than the second rotational angle $\theta_{CBB2}$ associated with the second position (dashed lines) and/or in the second direction (e.g., clockwise direction) to positions having rotational angles $\theta_{CBB}$ less than the first rotational angle $\theta_{CBB1}$ associated with the first position (solid lines). Moreover, the counter-balance body 300 may move/pitch around the lateral axis (y-axis) relative to the IPB 200 at any position between the first position (solid lines) and the second position (dashed lines) shown in FIG. 1C.

Referring back to FIGS. 1A and 1B, the at least one leg 400 includes a right leg 400a and a left leg 400b. The right leg 400a includes a corresponding first end 410, 410a rotatably coupled to the second end portion 220 of the IPB 200 and a corresponding second end 420, 420a rotatably coupled to a corresponding right drive wheel 500, 500a. A right hip joint 412 may rotatably couple the first end 410a of the right leg 400a to the second end portion 220 of the IPB 200 to allow at least a portion of the right leg 400a to move/pitch around the lateral axis (y-axis) relative to the IPB 200. A leg actuator 413 associated with the hip joint 412 may cause an upper portion 401, 401a of the right leg 400a to move/pitch around the lateral axis (y-axis) relative to the IPB 200. In some configurations, the right leg 400a includes the corresponding upper portion 401, 401a and a corresponding lower portion 402, 402a. The upper portion 401a may extend from the hip joint 412 at the first end 410a to a corresponding knee joint 414 and the lower portion 402a may extend from the knee joint 414 to the second end 420a.

The right leg 400a may include a corresponding right ankle joint 422, 422a configured to rotatably couple the right drive wheel 500a to the second end 420a of the right leg 400a. Here, the right ankle joint 422a may be associated with a wheel axle coupled for common rotation with the right drive wheel 500a and extending substantially parallel to the lateral axis (y-axis). The right drive wheel 500a may include a corresponding torque actuator (drive motor) 510, 510a configured to apply a corresponding axle torque $T_a$ (FIG. 1B) for rotating the right drive wheel 500a about the ankle joint 422a to move the right drive wheel 500a across the ground surface 12 along the fore-aft axis (x-axis). For instance, the axle torque $T_a$ may cause the right drive wheel 500a to rotate in a first direction for moving the robot 100 in a forward direction along the fore-aft axis (x-axis) and/or cause the right drive wheel 500a to rotate in an opposite second direction for moving the robot 100 in a rearward direction along the fore-aft axis (x-axis).

The left leg 400b similarly includes a corresponding first end 410, 410b rotatably coupled to the second portion 220 of the IPB 200 and a corresponding second end 420, 420b rotatably coupled to a corresponding left drive wheel 500, 500b. A corresponding hip joint 412 may rotatably couple the first end 410b of the left leg 400b to the second end portion 220 of the IPB 200 to allow at least a portion of the left leg 400b to move/pitch around the lateral axis (y-axis) relative to the IPB 200. A corresponding leg actuator 413 associated with the left hip joint 412 may cause a corresponding upper portion 401, 401b of the left leg 400b to move/pitch around the lateral axis (y-axis) relative to the IPB 200. As with the right leg 400a, the left leg 400b may include the corresponding upper portion 401, 401b and a corresponding lower portion 402, 402b. The upper portion 401b may extend from the hip joint 412 at the first end 410b to a corresponding knee joint 414 and the lower portion 402b may extend from the knee joint 414 to the second end 420b.

The left leg 400b may include a corresponding left ankle joint 422, 422b configured to rotatably couple the left drive wheel 500b to the second end 420b of the left leg 400b. Here, the left ankle joint 422b may be associated with a wheel axle coupled for common rotation with the left drive wheel 500b and extending substantially parallel to the lateral axis (y-axis). As with the right drive wheel 500a, the left drive wheel 500b may include a corresponding torque actuator (e.g., drive motor) 510b configured to apply a corresponding axle torque $T_a$ for rotating the left drive wheel 500b about the ankle joint 422b to move the left drive wheel 500b across the ground surface 12 along the fore-aft axis (x-axis). For instance, the axle torque $T_a$ may cause the left drive wheel 500b to rotate in the first direction for moving the robot 100 in the forward direction along the fore-aft axis (x-axis) and/or cause the left drive wheel 500b to rotate in the opposite second direction for moving the robot 100 in the rearward direction along the fore-aft axis (x-axis).

The corresponding axle torques $T_a$ applied to each of the drive wheels 500a, 500b may vary to maneuver the robot 100 across the ground surface 12. For instance, an axle torque $T_{aR}$ applied to the right drive wheel 500a that is greater than an axle torque $T_{aL}$ applied to the left drive wheel 500b may cause the robot 100 to turn to the left, while applying a greater axle torque $T_a$ to the left drive wheel 500b than to the right drive wheel 500a may cause the robot 100 to turn to the right. Similarly, applying substantially the same magnitude of axle torque $T_a$ to each of the drive wheels

500a, 500b may cause the robot 100 to move substantially straight across the ground surface 12 in either the forward or reverse directions. The magnitude of axle torque $T_a$ applied to each of the drive wheels 500a, 500b also controls velocity of the robot 100 along the fore-aft axis (x-axis). Optionally, the drive wheels 500a, 500b may rotate in opposite directions to allow the robot 100 to change orientation by swiveling on the ground surface 12. Thus, each axle torque $T_a$ may be applied to the corresponding drive wheel 500 independent of the axle torque $T_a$ (if any) applied to the other drive wheel 500.

FIG. 1B shows the right ankle joint 422a (e.g., wheel axle) rotatably coupling the right drive wheel 500a to the second end 420a of the right leg 400a and exerting an axle force $F_a$. The left ankle joint 422b similarly exerts a corresponding axle force $F_a$ (not shown). The axle forces $F_a$ may assist in adjusting the pose P of the robot 100 and/or be controlled for balancing the robot 100. The axle force $F_a$ is generated based on a magnitude of horizontal force $F_x$ exerted on the corresponding ankle joint 422 along the fore-aft axis (x-axis), a magnitude of vertical force $F_z$ exerted on the corresponding ankle joint 422 along a vertical axis (z-axis), and the magnitude of axle torque $T_a$ applied by the corresponding torque actuator 510 to the correspond corresponding wheel 500.

In some implementations, each leg 400 has a variable length extending between the first and second ends 410, 420 of the corresponding leg 400. For instance, the lower portion 402 of each leg 400 may rotate relative to the corresponding upper portion 401 about the knee joint 414 to enable the leg 400 to retract and expand. Referring to FIG. 1B, rotation by the lower portion 402 about the knee joint 414 relative to the upper portion 401 in the counter-clockwise direction may cause the leg 400 to retract. At the same time, the upper portion 401 may rotate about the hip joint 412 relative to the IPB 200 in the clockwise direction to cause the leg 400 to retract. Similarly, rotation by the lower portion 402 about the knee joint 414 relative to the upper portion 401 in the clockwise direction and/or rotation by the upper portion 401 about the hip joint 412 relative to the IPB 200 in the counter-clockwise direction may cause the leg 400 to expand. As used herein, retracting the length of the leg 400 may cause a height of the corresponding leg 400 with respect to the ground surface 12 to reduce while expanding the length of the leg 400 may cause the height of the corresponding leg 400 with respect to the ground surface 12 to increase. In some examples, the height of the leg 400 is defined as a distance along the vertical axis (z-axis) between the ground surface 12 (or the corresponding ankle joint 422) supporting the robot 100 and the corresponding knee joint 414. In other examples, the height of the leg 400 is defined as a distance along the vertical axis (z-axis) between the ground surface 12 (or the corresponding ankle joint 422) and the corresponding hip joint 412 rotatably coupling the corresponding first end 410 of the leg 400 to the second end portion 220 of the IPB 200.

In some implementations, retracting the length of both legs 400 causes an overall height of the robot 100 to decrease while expanding the length of both legs 400 causes the overall height of the robot 100 to increase. For instance, the robot 100 may need to lower, for example by crouching, to clear obstacles such as, without limitation, doorways, overhangs, light fixtures, or ceilings. It may also be desirable to lower the robot 100 to shift the CM downward to increase stability in certain scenarios. On the other hand, an increase to the overall height of the robot 100 may be required to reach or place a target object on a shelf. Altering the height of the robot 100 simultaneously alters the pose P, and may cause substantive shifts in the CM of the robot 100 that require actuation of the counter-balance body 300 to move relative to the IPB 200 to maintain balance of the robot 100. The heights of the legs 400 may be dynamically controlled to target heights to assist with turning maneuvers as the robot 100 traverses along the ground surface 12. For instance, dynamically adjusting the height of each leg 400 independently from one another may allow the robot 100 to lean and bank into turns, thereby enhancing maneuverability of the robot 100 while traversing across the ground surface 12.

Referring back to FIG. 1A, retracting and expanding the length of each leg 400 may be controlled via a corresponding belt drive actuator 415 configured to drive a belt 417 coupled for common rotation with the corresponding knee joint 414. For instance, each leg 400 may include a corresponding belt drive actuator 415 disposed at or near the corresponding hip joint 412 and the corresponding belt 417 may have a first end coupled to the actuator 415 and a second end coupled to the knee joint 414. Here, the belt drive actuator 415 may rotate the corresponding upper portion 401 relative to the IPB 200 and drive the belt 417 in one direction to prismatically extend/expand the length of the leg 400 by causing the corresponding lower portion 402 to rotate about the knee joint 414 relative to the upper portion 401 in the clockwise direction (relative to the view of FIG. 1A). On the other hand, the belt drive actuator 415 may drive the belt 417 in the opposite direction to prismatically retract the length of the leg 400 by causing the corresponding lower portion 402 to rotate about the knee joint 414 relative to the upper portion 401 in the counter-clockwise direction (relative to the view of FIG. 1A). The belt 417 may include a continuous loop extending along the upper portion 402 of each leg 400 or may include terminal ends each connected to a respective one of the belt drive actuator 415 or the knee joint 414. The belt drive actuator 415 may include a ball-screw type actuator. In some examples, the belt drive actuator 415 and belt 417 employs a 2:1 belt coupling so that the lower portion 402 rotates about the knee joint 414 relative to the upper portion 401 at twice the angle of the rotation of the upper portion 401 about the hip joint 415, thereby causing the second end 420 of the leg 400 to move on a straight line equivalent to a linear rail. Optionally, instead of a two-link leg (e.g., upper and lower portions 401, 402), the at least one leg 400 may include a single link that prismatically extends/retracts linearly such that the second end 420 of the leg 400 prismatically moves away/toward the IPB 200 along a linear rail. Accordingly, the at least one leg 400 includes a prismatic leg having the first end 410 prismatically coupled to the second end portion 220 of the IPB 200 and configured to provide prismatic extension/retraction via actuation of the belt drive actuator 415 to drive the belt 417 in corresponding first or second directions. In other configurations, the knee joint 414 may employ a corresponding rotational actuator for rotating the lower portion 402 relative to the upper portion 401 in lieu of the belt 417 driven by the belt drive actuator 415 disposed at or near the hip joint 412.

In some implementations, the robot 100 further includes one or more appendages, such as an articulated arm 600 disposed on the IPB 200 and configured to move relative to the IPB 200. The articulated arm 600 may have five-degrees of freedom. Moreover, the articulated arm 600 may be interchangeably referred to as a manipulator arm, a manipulator head, or simply an appendage. While FIGS. 1A-1E show the articulated arm 600 disposed on the second end portion 220 of the IPB 200, the articulated arm 600 may be disposed on the first end portion 210 of the IPB 200 in other configurations. The articulated arm 600 extends between a proximal first end 610 and a distal second end 620. Referring to FIG. 1B, the first end 610 connects to the IPB 200 at a first articulated arm joint $J_0$ 650. The first articulated arm joint $J_0$ 650 may be disposed between the left and right hip joints 412 to center the articulated arm 600 between the left and right sides of the IPB 200. In some examples, the first articulated arm joint $J_0$ 650 rotatably couples the proximal first end 610 of the articulated arm 600 to the IPB 200 to enable the manipulator arm 600 to rotate relative to the IPB 200. For instance, the articulated arm 600 may move/pitch about the lateral axis (y-axis) relative to the IPB 200. A rotational actuator 652 (e.g., manipulator head actuator) may be positioned at or near the first articulated arm joint $J_0$ 650 for rotating the articulated arm 600 (e.g., manipulator head) about the lateral axis (y-axis). The rotational actuator 652 may include an electric motor, electro-hydraulic servo, piezo-electric actuator, solenoid actuator, pneumatic actuator, or other actuator technology suitable for accurately effecting movement of the articulated arm 600.

In some scenarios, the articulated arm 600 rotates at the first articulated arm joint $J_0$ 650 about the lateral axis (y-axis) relative to the IPB 200 in the direction of gravity (e.g., in the clockwise direction relative to the view of FIG. 1B) to lower the CM of the robot 100. The robot 100 may lower the CM closer to the ground surface while executing turning maneuvers. The counter-balance body 300 may also simultaneously rotate about the lateral axis (y-axis) relative to the IPB 200 in the direction of gravity (e.g., in the counter-clockwise direction relative to the view of FIG. 1B) to assist in lowering the CM of the robot 100. Here, the articulated arm 600 and the counter-balance body 300 may cancel out any shifting in the CM of the robot 100 in the forward or rearward direction along the fore-aft axis (x-axis), while still effectuating the CM of the robot 100 shift downward closer to the ground surface 12.

An end effector 700 may be disposed on the distal second end 620 of the manipulator arm 600. The end effector 700 may include one or more actuators 702 (grippers) that may be configured to grip and manipulate a target object. Additionally or alternatively, the end effector 700 may employ a vacuum device and/or one or more suction cups 704 (FIG. 1A) configured to apply suction for gripping and holding a target object when the end effector 700 is positioned on the target object. FIG. 1B shows the end effector 700 exerting a corresponding end effector force $F_{ee}$. The manipulator arm 600 and/or the end effector 700 may include perception sensors for identifying objects in relation to the robot 100.

The articulated arm 600 may include two or more portions. In the examples shown in FIGS. 1A-1C, the articulated arm 600 includes a first portion 601, a second portion 602, and a third portion 603. The first portion 601 may extend between the proximal first end 610 connected to the IPB 200 via the first articulated arm joint $J_0$ 650 and a second articulated arm joint $J_1$ 660. The second portion 602 may extend between the second articulated arm joint $J_1$ 660 and a third articulated arm joint $J_2$ 670. The third portion 603 may extend between the third articulated arm joint $J_2$ 670 and the distal second end 620 of the articulated arm 600 that connects to the end effector 700. As with the first articulated arm joint $J_0$ 650, the second and third articulated arm joints $J_1$ 660, $J_2$ 670 may each be associated with a corresponding actuator 662, 672 configured and to move each portion 602, 603 relative to one another and relative to the IPB 200. For instance, the rotational actuator 652 associated with the first articulated arm joint $J_0$ 650 may cause the first portion 601 of the articulated arm 600 to move/pitch about the lateral axis (y-axis) relative to the IPB 200. As the second and third portions 602, 603 of the articulated arm 600 are connected to the first portion 601 via the second and third articulated arm joints $J_1$ 660, $J_2$ 670, the rotation by the first portion 601 about the lateral axis (y-axis) at the first articulated arm joint $J_0$ 650 may also cause the second and third portions 602, 603 to simultaneously move relative to the IPB 200.

Similarly, the rotational actuator 662 associated with the second articulated arm joint $J_1$ 660 may cause the second portion 602 of the articulated arm 600 to move/pitch about the lateral axis (y-axis) relative to both the IPB 200 and the first portion 601 of the articulated arm 600. Moreover, the rotational actuator 672 associated with the third articulated arm joint $J_2$ 670 may cause the third portion 603 of the articulated arm 600 to move/pitch about the lateral axis (y-axis) relative to the IPB 200 and the first and second portions 601, 602 of the articulated arm 600. The actuators 652, 662, 672 may be controlled independently of one another to move the corresponding portions 601, 602, 603 alone or in concert for positioning the end effector 700 on a target object and/or altering the pose P of the robot 100.

In some configurations, the counter-balance body 300 corresponds to a first counter-balance body 300 disposed on the first end portion 210 of the IPB 200 and the articulated arm 600 corresponds to a second counter-balance body 600 disposed on the second end portion 210 of the IPB 200. Similar to the first counter-balance body 300 discussed above, the articulated arm 600 may be configured to move relative to the IPB 200 for altering the pose P of the robot 100 by moving the CM of the robot 100 relative to the vertical gravitational axis $V_g$. For instance, the articulated arm 600 may generate/impart a moment $M_{AA}$ (rotational force) (FIG. 1B) at the first articulated arm joint $J_0$ based on a rotational angle of the articulated arm 600 relative to the vertical gravitational axis $V_g$. Thus, the articulated arm 600 may move relative to the IPB 200 to alter the pose P of the robot 100 by moving the CM of the robot 100 relative to the vertical gravitational axis $V_g$. In some configurations, a gyroscope could be disposed at the first articulated arm joint $J_0$ to impart the moment $M_{AA}$ (rotational force) for maintaining balance of the robot 100 in the upright position.

Figure 1D:
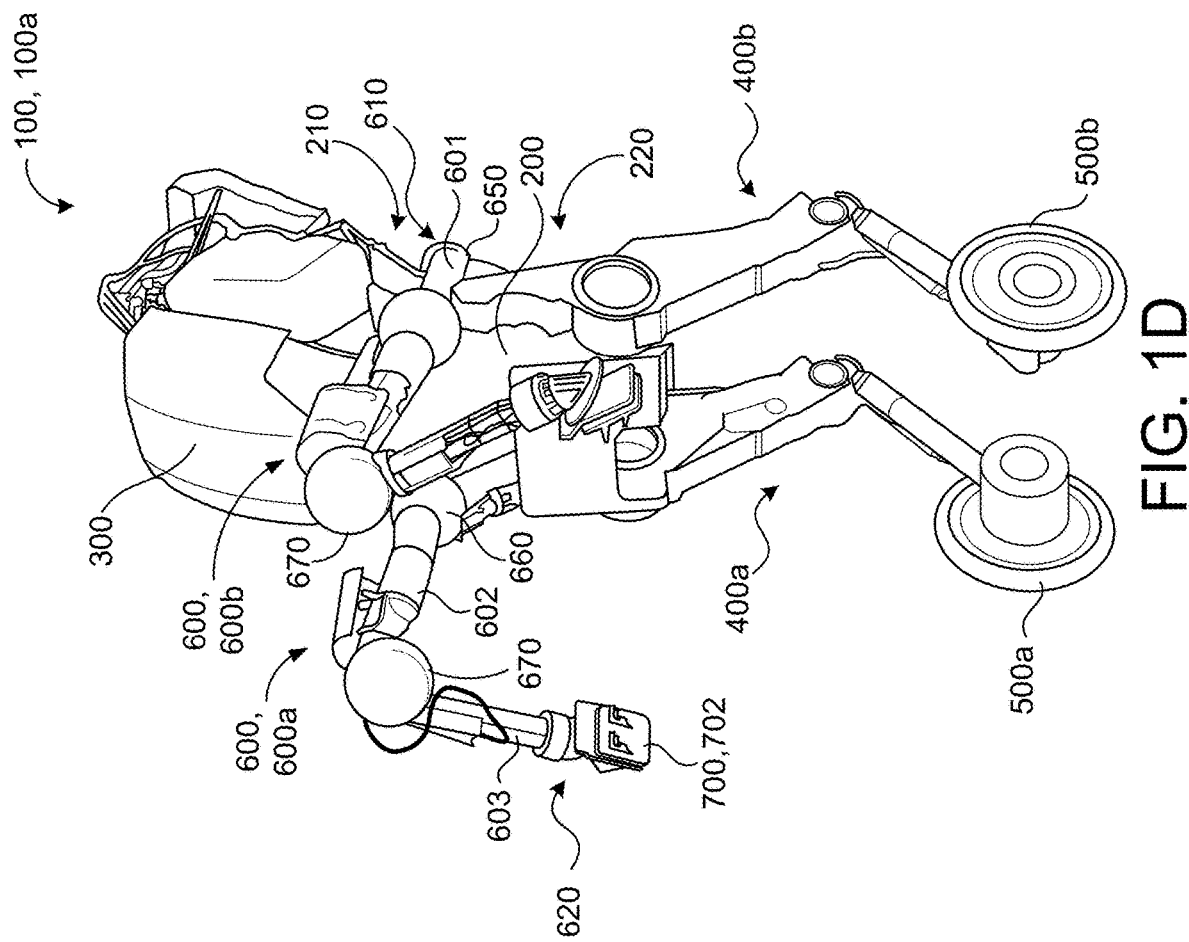
FIGS. 1D and 1E are schematic views showing an example robot having two appendages disposed on an inverted pendulum body.
Figure 1E:
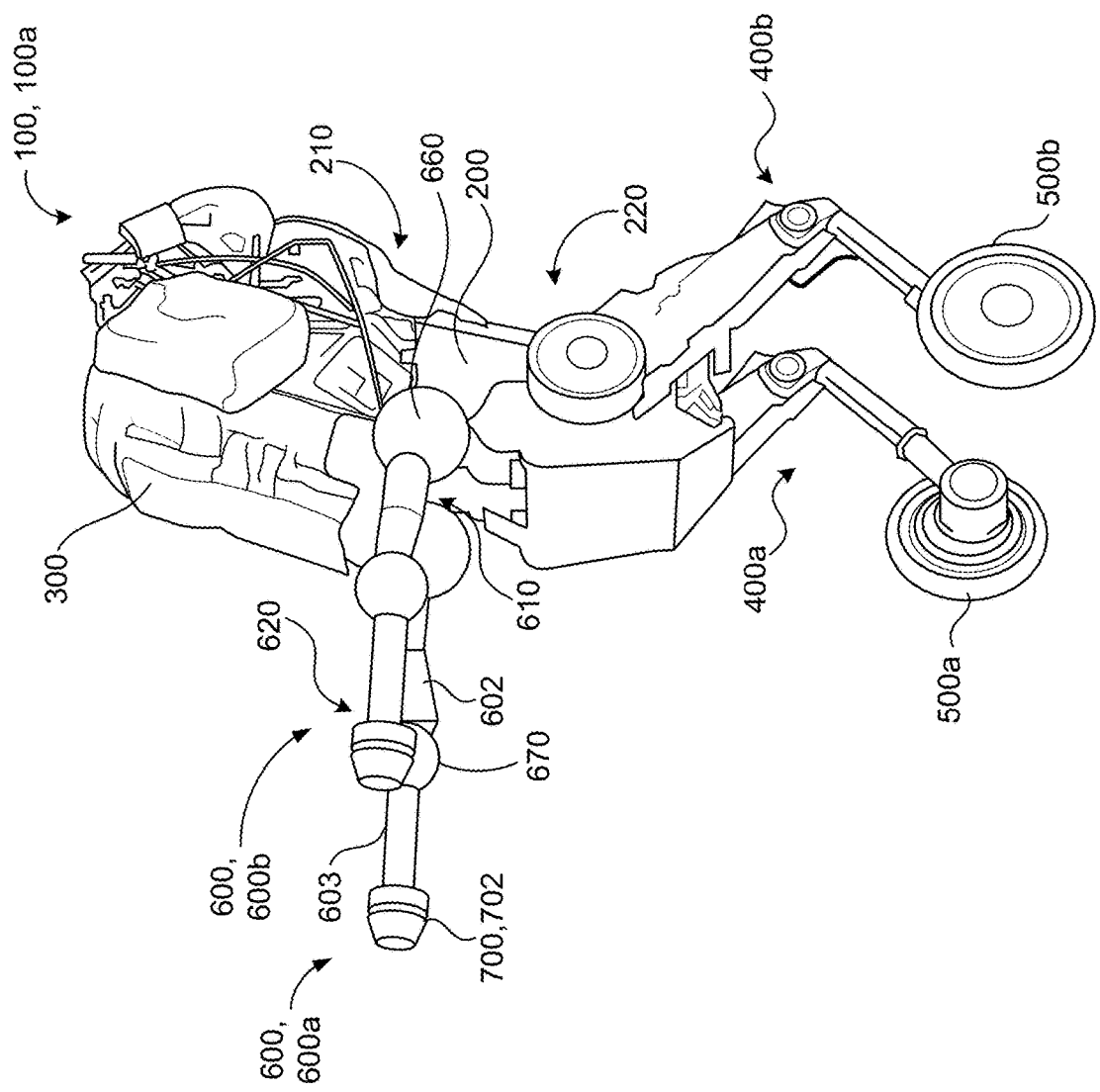

Referring to FIGS. 1D and 1E, in some implementations, the robot 100 includes left and right appendages (e.g., two articulated arms) 600a, 600b each disposed on the IPB 200 and configured to move relative to the IPB 200. The appendages 600a, 600b may be disposed on the first end portion 210 of the IPB 200 or the second end portion 220 of the IPB 200. As with the single articulated arm 600, each appendage 600a, 600b extends between a respective proximal first end 610 and a respective distal second end 620, and the first end 610 connects to the IPB 200 at a corresponding first articulated arm joint $J_0$ 650. Here, each first articulated arm joint $J_0$ 650 may be disposed on an opposite side of the IPB 200. Each appendage 600a, 600b may also include the one or more respective portions 601, 602, 603 connected by respective articulated arm joints $J_1$ 660, $J_2$ 670 as discussed above with reference to the single articulated arm 600 of FIGS. 1A-1C. Accordingly, each appendage 600a, 600b may be controlled to operate in substantially the same manner as the single articulated arm 600.

FIG. 1D shows the appendages 600a, 600b each having the corresponding first and second portions 601, 602 extending substantially parallel to one another and away from the IPB 200, while the corresponding third portion 603 extends substantially perpendicular to the first and second portions 601, 602 to point the corresponding distal second end 620 downward toward the ground surface 12. Here, the position of the appendages 600a, 600b may align the end effectors 700 and associated actuators 702 to grasp and carry an object. The appendages 600a, 600b could also point downward as shown in FIG. 1D for adjusting the moment of inertia about the vertical z-axis to assist with turning maneuvers. FIG. 1E shows the appendages 600a, 600b fully extended/deployed outward from the IPB 200 with each appendage 600a, 600b having the corresponding portions 601, 602, 603 substantially aligned with one another and extending substantially parallel to the ground surface 12. In some examples, the robot 100 may fully extend one or both of appendages 600a, 600b as shown in FIG. 1E for adjusting the moment of inertia about the vertical z-axis.

Referring back to FIG. 1C, the robot 100 includes a control system 10 configured to monitor and control operation of the robot 100. In some implementations, the robot 100 is configured to operate autonomously and/or semi-autonomously. However, a user may also operate the robot by providing commands/directions to the robot 100. In the example shown, the control system 10 includes a controller 102 (e.g., data processing hardware), memory hardware 104, an inertial measurement unit 106, actuators 108, one or more sensors 110, and one or more power sources 112. The control system 10 is not limited to the components shown, and may include additional or less components without departing from the scope of the present disclosure. The components may communicate via wireless or wired connections and may be distributed across multiple locations of the robot 100. In some configurations, the control system 10 interfaces with a remote computing device and/or a user. For instance, the control system 10 may include various components for communicating with the robot 100, such as a joystick, buttons, wired communication ports, and/or wireless communication ports for receiving inputs from the remote computing device and/or user, and providing feedback to the remote computing device and/or user.

The controller 102 corresponds to data processing hardware that may include one or more general purpose processors, digital signal processors, and/or application specific integrated circuits (ASICs). In some implementations, the controller 102 is a purpose-built embedded device configured to perform specific operations with one or more subsystems of the robot 100. The memory hardware 104 is in communication with the controller 102 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to, inter alia, to store instructions (e.g., computer-readable program instructions), that when executed by the controller 102, cause the controller to perform numerous operations, such as, without limitation, altering the pose P of the robot 100 for maintaining balance, maneuvering the robot 100 across the ground surface 12, transporting objects, and/or executing a sit-to-stand routine. The controller 102 may directly or indirectly interact with the inertial measurement unit 106, the actuators 108, the sensor(s) 110, and the power source(s) 112 for monitoring and controlling operation of the robot 100.

The inertial measurement unit 106 is configured to measure an inertial measurement indicative of a movement of the robot 100 that results in a change to the pose P of the robot 100. The inertial measurement measured by the inertial measurement unit 106 may indicate a translation or shift of the CM of the robot 100 relative to the vertical gravitational axis $V_g$. The translation or shift of the CM may occur along one or more of the fore-aft axis (x-axis), the lateral axis (y-axis), or the vertical axis (z-axis). For instance, the inertial measurement unit 106 may detect and measure an acceleration, a tilt, a roll, a pitch, a rotation, or yaw of the robot 100, as the inertial measurement, using an initial pose P as an inertial reference frame. To detect and to measure, the inertial measurement unit 106 may include at least one of a tri-axial accelerometer, a tri-axial magnetometer, or a tri-axial gyroscope. The tri-axial accelerometer includes circuitry to sense the movement of the robot 100 between poses along a straight line or an axis, such as a position and an orientation of the inertial measurement unit 106. In some examples, the accelerometer may use a mass-spring system or a vibration system configured to determine an acceleration corresponding to a displacement of a mass in the mass-spring system or a stress related to a vibration in the vibration system. The inertial measurement unit 106 may also include a gyroscope, such as the tri-axial gyroscope, to measure a rate of rotation about a defined axis. The gyroscope is configured to sense rotation of the inertial measurement unit 106 such that a sensed rotation is a portion of the inertial measurement output to the controller 102. The controller 102 receives the inertial measurement of the inertial measurement unit 106 and determines shifts in the CM of the robot 100 relative to the vertical gravitational axis $V_g$. Thus, the gyroscope senses rotations of the robot 100 as the robot 100 moves with the gyroscope. The inertial measurement unit 106 may include more than one of the tri-axial accelerometer, the tri-axial magnetometer, or the tri-axial gyroscope to increase accuracy of the inertial measurement unit 106. In some examples, the inertial measurement unit 106 produces three dimensional measurements of a specific force and an angular rate. The inertial measurement unit 106 may also include a microprocessor.

The controller 102 is configured to process data relating to the inertial measurement unit 106, the actuators 108, and the sensor(s) 110 for operating the robot 100. The controller 102 receives an inertial measurement from the inertial measurement unit 106 (e.g., via a wired or wireless connection) disposed on the robot 100 and instructs actuation of at least one of the actuators 108 to alter a pose P of the robot 100 to move the CM of the robot 100 relative to the vertical gravitational axis $V_g$. In some examples, the controller 102 identifies changes in the inertial measurements between poses P and defines movements by at least one of the counter-balance body 300 or the articulated arm 600 for maintaining balance of the robot 100 by moving the CM relative to the vertical gravitational axis $V_g$.

The actuators 108 may include the tail actuator 352 connected to the tail 300 (e.g., counter-balance body), the leg actuators 413 each connected to the respective leg 400, the drive motors 510 each coupled to the respective drive wheel 500 of the corresponding leg 400, and the manipulator head actuator 652 connected to the manipulator head 600 (e.g., articulated arm). The tail actuator 352 is configured to move the tail 300 relative to the torso 200. For instance, the controller 102 may instruct actuation of the tail actuator 352 to move/pitch the tail 300 about the lateral axis (y-axis) relative to the torso 200. The manipulator head actuator 652 is configured to move the manipulator head 600 relative to the torso 200. For instance, the controller 102 may instruct actuation of the manipulator head actuator 652 to move/pitch the manipulator head 600 about the lateral axis (y-axis) relative to the torso 200. In some examples, the controller 102 actuates the manipulator head actuator 652 to operate the manipulator head 600 as a second counter-balance body for altering the pose P of the robot 100 by moving the CM of the robot 100 relative to the vertical gravitational axis $V_g$. The controller 102 may additionally or alternatively instruct actuation of at least one of the actuator 662 corresponding to the second articulated arm joint (e.g., second manipulator head joint) $J_1$ 660 or the actuator 662 corresponding to the third articulated arm joint (e.g., third manipulator head joint) $J_2$ 670 for moving at least one of the portions 601, 602, 603 of the manipulator head relative to one another and relative to the torso 200.

Each leg actuator 413 (disposed at or near the corresponding hip joint 412) is configured to rotate the upper portion 401 of the respective leg 400 relative to the torso 200. For instance, the controller 102 may instruct actuation of the leg actuator 413 or the belt drive actuator 415 associated with the right hip joint 412 to cause the upper portion 401 of the prismatic right leg 400a to move/pitch around the lateral axis (y-axis) relative to the tail 200. Similarly, the controller 102 may instruct actuation of the leg actuator 413 associated with the left hip joint 412 to cause the left leg 400b to move/pitch around the lateral axis (y-axis) relative to the tail 200. In some implementations, the actuators 108 further include the belt drive actuators 415 configured to drive the corresponding belts 417 when actuated by the controller 102. For instance, the controller 102 may instruct actuation of the belt drive actuator 415 in first/second directions to prismatically extend or retract a length of a respective prismatic leg 400 by causing a lower portion 402 of the prismatic leg 400 to rotate about the corresponding knee joint 414 relative to the corresponding upper portion 401. In some configurations, an actuator is disposed at the corresponding knee joint 414 in lieu of the belt drive actuator 415 for moving the lower portion 402 of the leg 400 relative to the upper portion 401.

Each drive motor 510 is configured to apply the corresponding axle torque (FIG. 1B) for rotating the respective drive wheel 500 about the corresponding ankle joint 422 to move the drive wheel 500 across the ground surface 12 along the fore-aft axis (x-axis). For instance, the axle torque $T_a$ may cause the drive wheel 500 to rotate in a first direction for moving the robot 100 in a forward direction along the fore-aft axis (x-axis) and/or cause the drive wheel 500 to rotate in an opposite second direction for moving the robot 100 in a rearward direction along the fore-aft axis (x-axis). The controller 102 may instruct actuation of each drive motor 510 via a corresponding axle torque command $T_{a\_cmd}$ that specifies a magnitude and direction of axle torque $T_a$ for the drive motor 510 to apply for rotating the respective drive wheel 500 in the forward or backward direction. Based on the inertial measurement received from the inertial measurement unit 106, the controller 102 may provide a corresponding axle torque command $T_{a\_cmd}$ to at least one of the drive motors 510 to instruct the drive motor 510 to apply the corresponding axle torque $T_a$ in order to control tilt to maintain or restore balance of the robot 100.

The sensor(s) 110 of the control system 10 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 110 may be disposed on the robot 100 at various locations such as the torso 200, tail 300, the at least one leg 400, the drive wheel 500, the articulated arm 600, and/or the end effector 700. The sensors 110 are configured to provide corresponding sensor data to the controller 102 for monitoring and controlling operation of the robot 100 within an environment. In some examples, the controller 102 is configured to receive sensor data from sensors physically separated from the robot 100. For instance, the controller 102 may receive sensor data from a proximity sensor disposed on a target object the robot 100 is configured to locate and transport to a new location.

The sensor data from the sensors 110 may allow the controller 102 to evaluate conditions for maneuvering the robot 100, altering a pose P of the robot 100, and/or actuating various actuators 108 for moving/rotating mechanical components such as the counter-balance body 300, the at least one leg 400, the drive wheel 500 rotatably coupled to the at least one leg 400, the articulated arm 600, and the end effector 700. In some examples, the sensor data includes rotational positions of the back joint bk, 350, the hip joint(s) 412, and/or the articulated arm joints $J_0$ 650, $J_1$ 660, $J_2$ 670 used to indicate a state of at least one of the counter-balance body 300, the at least one leg 400, the articulated arm 600, or the end effector 700. In some examples, the robotic system 10 employs one or more force sensors to measure load on the actuators that move the counter-balance body 300, the at least one leg 400, the drive wheel 500 rotatably coupled to the at least one leg 400, the articulated arm 600, or the end effector 700. The sensors 110 may further include position sensors to sense states of extension, retraction, and/or rotation of the counter-balance body 300, the at least one leg 400, the drive wheel 500 rotatably coupled to the at least one leg 400, the articulated arm 600, or the end effector 700.

Other sensors 110 may capture sensor data corresponding to the terrain of the environment and/or nearby objects/obstacles to assist with environment recognition and navigation. For instance, some sensors 110 may include RADAR (e.g., for long-range object detection, distance determination, and/or speed determination) LIDAR (e.g., for short-range object detection, distance determination, and/or speed determination), VICON® (e.g., for motion capture), one or more imaging (e.g., stereoscopic cameras for 3D vision), perception sensors, a global positioning system (GPS) device, and/or other sensors for capturing information of the environment in which the robotic system 100 is operating.

In some implementations, the control system 10 includes one or more power sources 112 configured to power various components of the robot 100. The power sources 112 employed by the robot 100 may include, without limitation, a hydraulic system, an electrical system, energy storage device(s) (e.g. batteries), and/or pneumatic devices. For instance, one or more energy storage devices may provide power to various components (e.g., actuators 108) of the robot 100. The drive motors 510 may include electric motors that receive power from one or more energy storage devices. In some examples, the counter-balance body 300 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 100). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 100.

Figure 2:
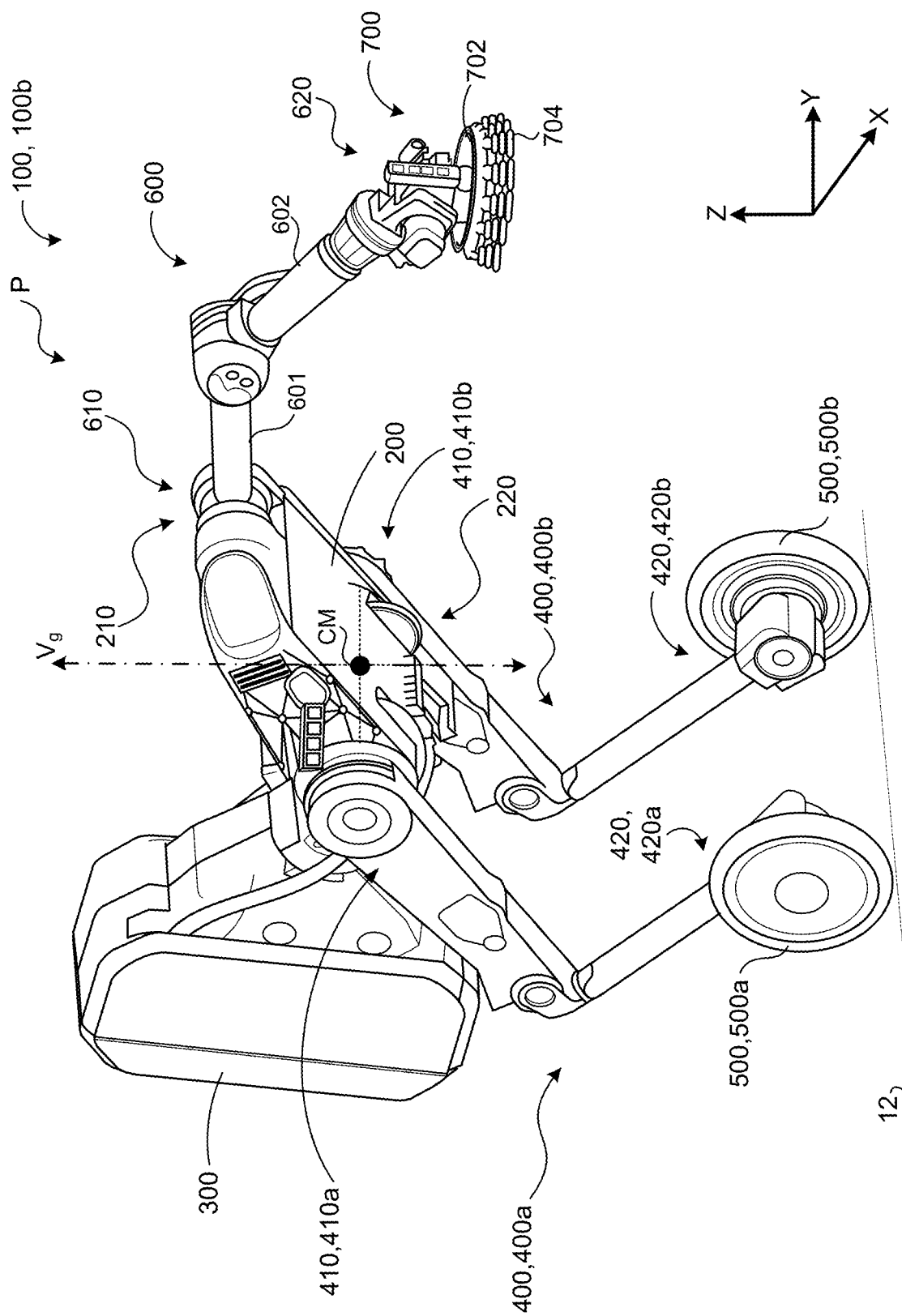
FIG. 2 is a schematic view of an example robot.

Referring to FIG. 2, in some implementations, a robot 100*b* includes an inverted pendulum body (IPB) 200, a counter-balance body 300 disposed on the IPB 200, at least one leg 400 having a first end 410 and a second end 420, and a drive wheel 500 rotatably coupled to the second end 420 of the at least one leg 400. In view of the substantial similarity in structure and function of the components associated with the robot 100*a* with respect to the robot 100*b*, like reference numerals are used herein after and in the drawings to identify like components.

As with the robot 100*a* of FIGS. 1A-1E, the robot 100*b* has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 includes the first end portion 210 and the second end portion 220. While the counter-balance body 300 of the robot 100*a* of FIGS. 1A-1E is disposed on the first end portion 210 of the IPB 200, the counter-balance body 300 of the robot 100*b* of FIG. 2 is disposed on the second end portion 220 of the IPB 200. In a similar fashion to the counter-balance body 300 of the robot 100*a*, the counter-balance body 300 of the robot 100*b* may pitch around a lateral axis (y-axis) that extends perpendicular to the gravitational vertical axis $V_g$ and a fore-aft axis (x-axis) of the robot 100 for altering a pose P of the robot 100*b*. For instance, the counter-balance body 300 may pitch relative to the gravitational vertical axis $V_g$ in a first direction for shifting the CM of the robot 100*b* towards the ground surface 12 and in an opposite second direction for shifting the CM of the robot 100*b* away from the ground surface 12. Accordingly, rotational movement by the counter-balance body 300 relative to the IPB 200 may be used for balancing and maintaining the robot 100*b* in an upright position.

The at least one leg 400 of the robot 100*b* may include the variable length right and left legs 400*a*, 400*b* each including a corresponding first end 410 rotatably/prismatically coupled to the second end portion 220 of the IPB 200 and a corresponding second end 420 rotatably coupled to a corresponding right drive wheel 500*a*, 500*b*. In a similar fashion to the robot 100*a*, the robot 100*b* may employ various actuators for altering the lengths of the legs 400*a*, 400*b*. For instance, a length/height of at least one of the legs 400*a*, 400*b* may be altered to lean the drive wheels 500*a*, 500*b* into a turning direction to assist with a turning maneuver.

With continued reference to FIG. 2, the robot 100*b* further includes an articulated arm 600 disposed on the IPB 200 and configured to move relative to the IPB 200. The articulated arm 600 may have five-degrees of freedom. By contrast to the robot 100*a* of FIGS. 1A-1E having the articulated arm 600 disposed on the second end portion 220 of the IPB 200, the robot 100*b* includes the articulated arm 600 disposed on the first end portion 210 of the IPB 200. The articulated arm 600 extends between a proximal first end 610 rotatably coupled to the IPB 200 and a distal second end 620. In the example shown, the articulated arm 600 includes two portion 601, 602 rotatable relative to one another and also the IPB 200; however, the articulated arm 600 may include more or less portions without departing from the scope of the present disclosure. An end effector 700 may be coupled to the distal second end 620 of the articulated arm 600 and may include one or more actuators 702 for gripping/grasping objects. The end effector 700 may optionally include one or more suction cups 704 configured to provide a vacuum seal between the end effector 700 and a target object to allow the articulated arm 600 to carry the target object.

The articulated arm 600 may pitch about the lateral axis (y-axis) relative to the IPB 200. For instance, the articulated arm may rotate about the lateral axis (y-axis) relative to the IPB 200 in the direction of gravity to lower the CM of the robot 100 while executing turning maneuvers. The counter-balance body 300 may also simultaneously rotate about the lateral axis (y-axis) relative to the IPB 200 in the direction of gravity to assist in lowering the CM of the robot 100*b*. Here, the articulated arm 600 and the counter-balance body 300 may cancel out any shifting in the CM of the robot 100*b* in the forward or rearward direction along the fore-aft axis (x-axis), while still effectuating the CM of the robot 100*b* shift downward closer to the ground surface 12.

Figure 3:
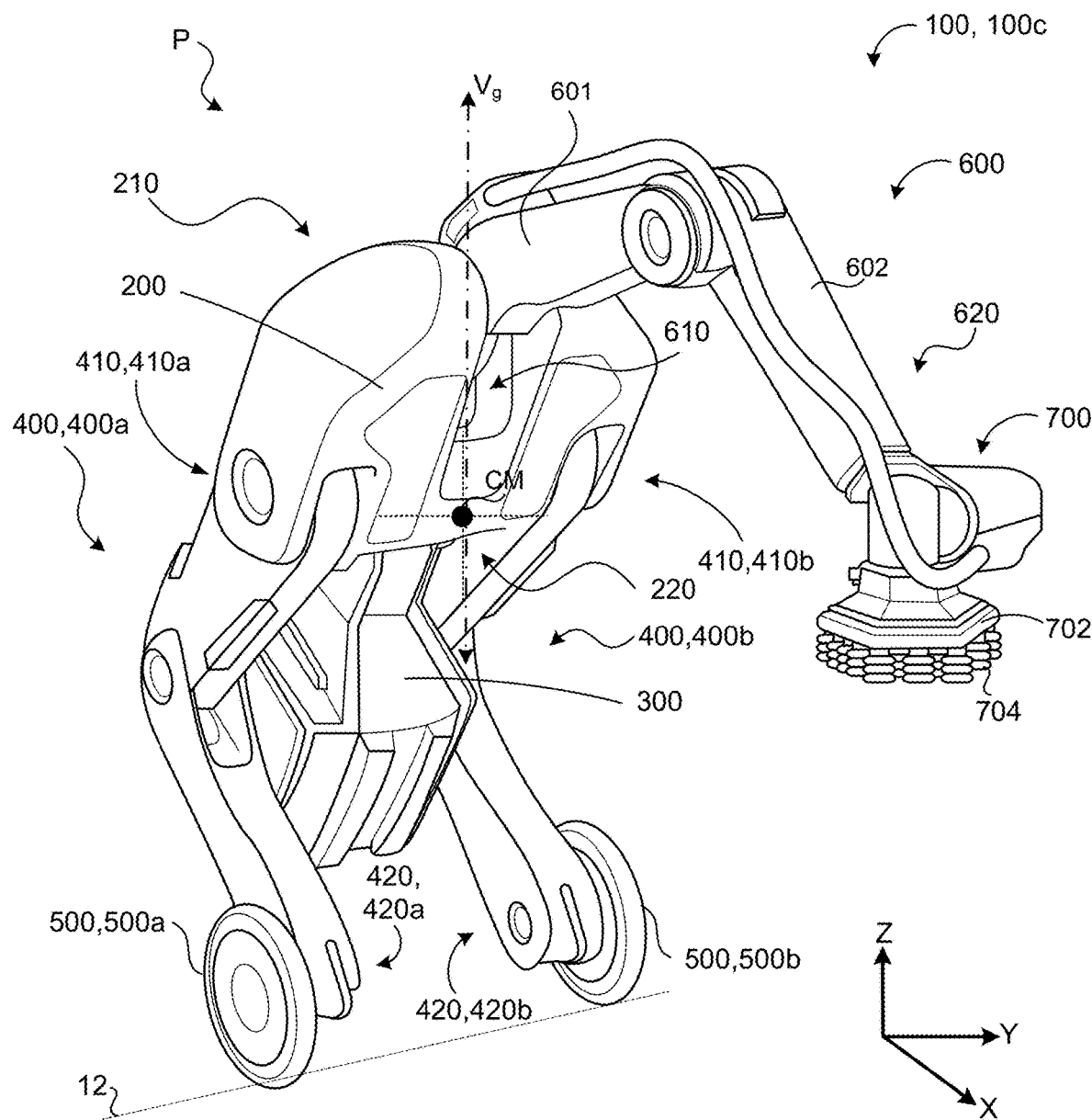
FIG. 3 is a schematic view of an example robot.

Referring to FIG. 3, in some implementations, a robot 100*c* includes an inverted pendulum body (IPB) 200, a counter-balance body 300 disposed on the IPB 200, at least one leg 400 having a first end 410 and a second end 420, and a drive wheel 500 rotatably coupled to the second end 420 of the at least one leg 400. In view of the substantial similarity in structure and function of the components associated with the robot 100*a* with respect to the robot 100*b*, like reference numerals are used herein after and in the drawings to identify like components.

As with the robot 100*a* of FIGS. 1A-1E, the robot 100*c* has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100*c*. The attitude of the robot 100 can be defined by an orientation or an angular position of an object in space.

The IPB 200 includes the first end portion 210 and the second end portion 220. While the counter-balance body 300 of the robot 100*a* of FIGS. 1A-1E is disposed on the first end portion 210 of the IPB 200, the counter-balance body 300 of the robot 100*c* of FIG. 3 is disposed on the second end portion 220 of the IPB 200. In a similar fashion to the counter-balance body 300 of the robot 100*a*, the counter-balance body 300 of the robot 100*b* may pitch around a lateral axis (y-axis) that extends perpendicular to the gravitational vertical axis $V_g$ and a fore-aft axis (x-axis) of the robot 100*c* for altering a pose P of the robot 100*c*. For instance, the counter-balance body 300 may pitch relative to the gravitational vertical axis $V_g$ in a first direction for shifting the CM of the robot 100*b* towards the ground surface 12 and in an opposite second direction for shifting the CM of the robot 100*c* away from the ground surface 12. Accordingly, rotational movement by the counter-balance body 300 relative to the IPB 200 may be used for balancing and maintaining the robot 100*c* in an upright position.

The at least one leg 400 of the robot 100*c* may include the variable length right and left legs 400*a*, 400*b* each including a corresponding first end 410 rotatably coupled to the second end portion 220 of the IPB 200 and a corresponding second end 420 rotatably coupled to a corresponding right drive wheel 500*a*, 500*b*. In a similar fashion to the robot 100*a*, the robot 100*c* may employ various actuators for altering the lengths of the legs 400*a*, 400*b*. For instance, a length/height of at least one of the legs 400a, 400b may be altered lean the drive wheels 500a, 500b into a turning direction to assist with a turning maneuver.

With continued reference to FIG. 3, the robot 100c further includes an articulated arm 600 disposed on the IPB 200 and configured to move relative to the IPB 200. The articulated arm 600 may have five-degrees of freedom. By contrast to the robot 100c of FIGS. 1A-1E having the articulated arm 600 disposed on the second end portion 220 of the IPB 200, the robot 100b includes the articulated arm 600 disposed on the first end portion 210 of the IPB 200. The articulated arm 600 extends between a proximal first end 610 rotatably coupled to the IPB 200 and a distal second end 620. In the example shown, the articulated arm 600 includes two portion 601, 602 rotatable relative to one another and also the IPB 200; however, the articulated arm 600 may include more or less portions without departing from the scope of the present disclosure. An end effector 700 may be coupled to the distal second end 620 of the articulated arm 600 and may include one or more actuators 702 for gripping/grasping objects. The end effector 700 may optionally include one or more suction cups 704 configured to provide a vacuum seal between the end effector 700 and a target object to allow the articulated arm 600 to carry the target object.

The articulated arm 600 may pitch about the lateral axis (y-axis) relative to the IPB 200. For instance, the articulated arm may rotate about the lateral axis (y-axis) relative to the IPB 200 in the direction of gravity to lower the CM of the robot 100c while executing turning maneuvers. The counterbalance body 300 may also simultaneously rotate about the lateral axis (y-axis) relative to the IPB 200 in the direction of gravity to assist in lowering the CM of the robot 100c. Here, the articulated arm 600 and the counter-balance body 300 may cancel out any shifting in the CM of the robot 100c in the forward or rearward direction along the fore-aft axis (x-axis), while still effectuating the CM of the robot 100b shift downward closer to the ground surface 12.

Figure 4:
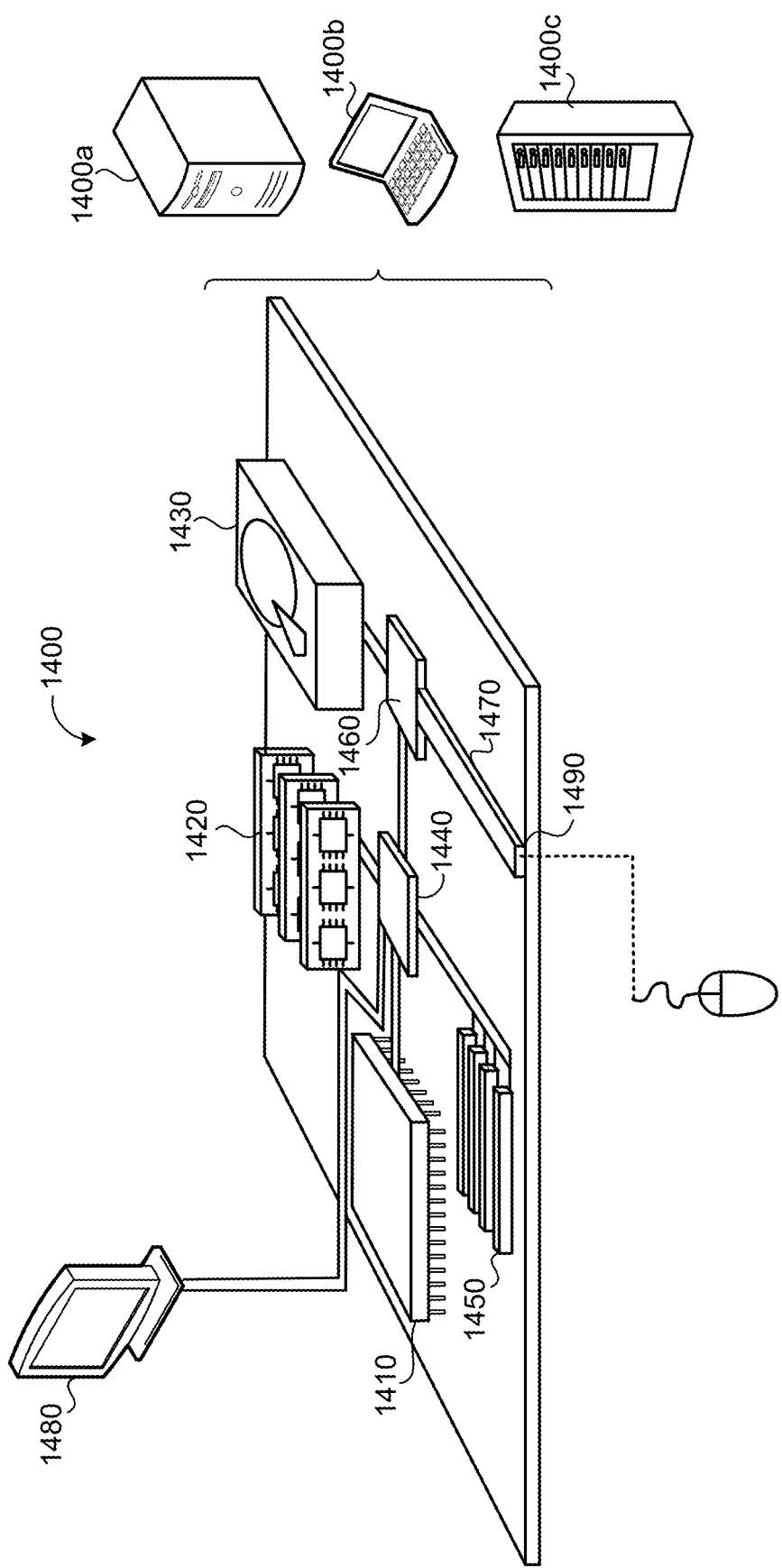
FIG. 4 is a schematic view of an example computing device.

FIG. 4 is schematic view of an example computing device 1400 that may be used to implement the systems and methods described in this document. The computing device 1400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1400 includes a processor 1410 (also referred to as data processing hardware), memory 1420 (also referred to as memory hardware), a storage device 1430, a high-speed interface/controller 1440 connecting to the memory 420 and high-speed expansion ports 1450, and a low speed interface/controller 460 connecting to a low speed bus 470 and a storage device 1430. Each of the components 1410, 1420, 1430, 1440, 1450, and 1460, are interconnected using various busses, and may be mounted on a common motherboard or in other manners as appropriate. The processor 1410 can process instructions for execution within the computing device 1400, including instructions stored in the memory 1420 or on the storage device 1430 to display graphical information for a graphical user interface (GUI) on an external input/output device, such as display 4180 coupled to high speed interface 1440. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1420 stores information non-transitorily within the computing device 1400. The memory 1420 may be a computer-readable medium, a volatile memory unit(s), or non-volatile memory unit(s). The non-transitory memory 1420 may be physical devices used to store programs (e.g., sequences of instructions) or data (e.g., program state information) on a temporary or permanent basis for use by the computing device 1400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1430 is capable of providing mass storage for the computing device 1400. In some implementations, the storage device 1430 is a computer-readable medium. In various different implementations, the storage device 1430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1420, the storage device 1430, or memory on processor 1410.

The high speed controller 1440 manages bandwidth-intensive operations for the computing device 400, while the low speed controller 1460 manages lower bandwidth-intensive operations. Such allocation of duties is exemplary only. In some implementations, the high-speed controller 1440 is coupled to the memory 1420, the display 1480 (e.g., through a graphics processor or accelerator), and to the high-speed expansion ports 1450, which may accept various expansion cards (not shown). In some implementations, the low-speed controller 1460 is coupled to the storage device 1430 and a low-speed expansion port 1490. The low-speed expansion port 1490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1400a or multiple times in a group of such servers 1400a, as a laptop computer 1400b, or as part of a rack server system 1400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
   an inverted pendulum body having first and second end portions;
   a counter-balance body disposed on the inverted pendulum body and configured to move about a lateral axis of the robot relative to the inverted pendulum body;
   at least one leg having first and second ends, the first end of the at least one leg prismatically coupled to the second end portion of the inverted pendulum body; and
   a drive wheel rotatably coupled to the second end of the at least one leg.

2. The robot of claim 1, wherein the counter-balance body is disposed on the first end portion of the inverted pendulum body.

3. The robot of claim 1, wherein the counter-balance body is disposed on the second end portion of the inverted pendulum body.

4. The robot of claim 1, wherein the at least one leg comprises:
   a right leg having first and second ends, the first end of the right leg prismatically coupled to the second end portion of the inverted pendulum body, the right leg having a right drive wheel rotatably coupled to the second end of the right leg; and
   a left leg having first and second ends, the first end of the left leg prismatically coupled to the second end portion of the inverted pendulum body, the left leg having a left drive wheel rotatably coupled to the second end of the left leg.

5. The robot of claim 1, wherein the at least one leg has a variable length between the first and second ends of the at least one leg.

6. The robot of claim 1, wherein the at least one leg further comprises:
   an upper portion extending between the first end prismatically coupled to the second end portion of the inverted pendulum body and a knee joint; and
   a lower portion extending between the knee joint and the second end rotatably coupled to the drive wheel.

7. The robot of claim 6, wherein the lower portion is rotatably coupled to the knee joint and configured to rotate relative to the upper portion to alter a length between the first and second ends of the leg.

8. The robot of claim 1, further comprising at least one articulated arm disposed on the inverted pendulum body and configured to move relative to the inverted pendulum body.

9. The robot of claim 8, wherein the at least one articulated arm is rotatably coupled to the first end portion of the inverted pendulum body.

10. The robot of claim 8, wherein the at least one articulated arm is rotatably coupled to the second end portion of the inverted pendulum body.

11. A robot comprising:
    a torso having first and second end portions;
    a manipulator head disposed on the torso and configured to move relative to the torso;
    a tail disposed on the torso and configured to move about a lateral axis of the robot relative to the torso;

at least one leg having first and second ends, the first end of the at least one leg prismatically coupled to the second end portion of the torso; and a drive wheel rotatably coupled to the second end of the at least one leg.

12. The robot of claim 11, further comprising:

a manipulator head actuator connected to the manipulator head and configured to move the manipulator head relative to the torso;

a tail actuator connected to the tail and configured to move the tail relative to the torso;

a leg actuator connected to the at least one leg and configured to rotate a portion of the at least one leg relative to the torso; and a drive motor coupled to the drive wheel of the at least one leg.

13. The robot of claim 12, wherein the manipulator head actuator is configured to pitch the manipulator head around a lateral axis of the robot relative to the torso, the lateral axis extending perpendicular to a fore-aft axis of the robot and a vertical gravitational axis.

14. The robot of claim 12, wherein the tail actuator is configured to pitch the tail around the lateral axis of the robot relative to the torso, the lateral axis extending perpendicular to a fore-aft axis of the robot and a vertical gravitational axis.

15. The robot of claim 12, wherein the leg actuator is configured to rotate the portion of the at least one leg relative to the torso to alter a length between the first and second ends of the leg.

16. The robot of claim 12, further comprising:

an inertial measurement unit; and a controller in communication with the inertial measurement unit, the manipulator head actuator, the tail actuator, the leg actuator, and the drive motor, the controller configured to perform operations comprising:

receiving inertial measurements from the inertial measurement unit, the inertial measurements indicative of a pose of the robot relative to a gravitational vertical axis; and instructing actuation of at least one of the manipulator head actuator, the tail actuator, the leg actuator, or the drive motor to alter a pose of the robot to move a center of mass of the robot relative to the gravitational vertical axis.

17. The robot of claim 12, wherein instructing actuation of at least one of the manipulator head actuator, the tail actuator, the leg actuator, or the drive motor comprises:

instructing actuation of the manipulator head actuator to move the manipulator head relative to the torso; and instructing actuation of the tail actuator to move the tail relative to the torso to cancel out any shifting in the center of mass of the robot along a fore-aft axis.

18. The robot of claim 11, wherein the at least one leg comprises:

a right leg having first and second ends, the first end of the right leg prismatically coupled to the second end portion of the torso, the right leg having a right drive wheel rotatably coupled to the second end of the right leg; and a left leg having first and second ends, the first end of the left leg prismatically coupled to the second end portion of the torso, the left leg having a left drive wheel rotatably coupled to the second end of the left leg.

19. The robot of claim 11, wherein the manipulator head is rotatably coupled to the first end portion of the torso and the tail is rotatably coupled to the second end portion of the torso.

20. The robot of claim 11, wherein the manipulator head is rotatably coupled to the second end portion of the torso and the tail is rotatably coupled to the first end portion of the torso.

21. The robot of claim 11, further comprising a second manipulator head disposed on the torso and configured to move relative to the torso.

* * * * *